United States Patent Office 2,785,167
Patented Mar. 12, 1957

2,785,167
ACEDIBENZIMIDAZOISOQUINOLONE VAT DYES

Herman E. Schroeder, Kennett Square, Pa., assignor to E. I. du Pont de Nemours and Company, Wilmington, Del., a corporation of Delaware No Drawing. Application December 8, 1955, Serial No. 551,741

4 Claims. (Cl. 260—288)

This invention describes novel acedibenzimidazoisoquinolone vat dyes which are useful in dyeing and printing cellulosic fibers in violet shades.

The inventor was faced with the problem of providing the first example of the cyclization of a heterocyclic derivative of glyoxal. Red-violet vat dyes of novel structures are thus produced.

It is an object of this invention to provide novel acedibenzimidazoisoquinolone vat dyes for dyeing and printing cellulosic fibers in violet shades. The new compounds of the present invention may also be utilized as pigments.

The new heterocyclic vat dyes of this invention dye and print cotton in violet shades from a green alkaline hydrosulfite vat, and are synthesized in three steps from homophthalic acid, o-phenylenediamine and glyoxal as illustrated by the following series of reactions:

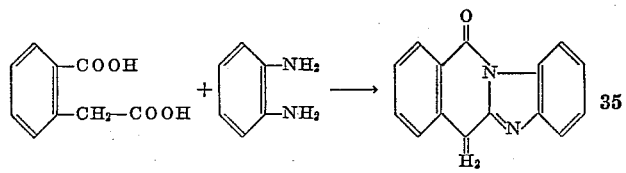

Product I and

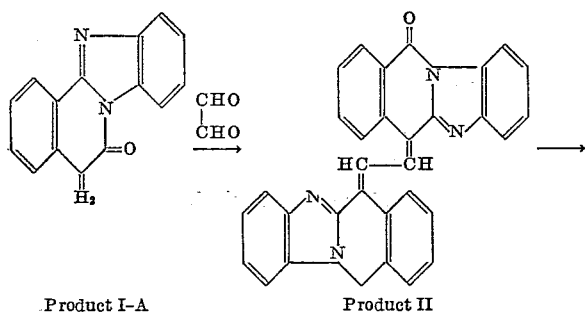

Product I-A      Product II

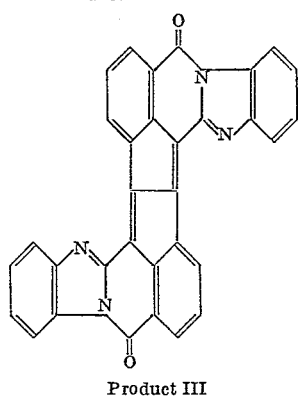

Product III

The first step is performed by heating the acid and the amine at high temperatures in an inert organic solvent such as trichlorobenzene. The ratio of the two isomers in the mixture is approximately 75% of (I) and 25% of (I-A). This conclusion is based on (a) analysis for the elements C, H and N, (b) solubility studies, (c) ultraviolet absorption studies of sulfuric acid solutions of the products and (d) studies of infra red spectra obtained from mineral oil suspensions of the products.

The second step is completed by heating the benzimidazoisoquinolone and aqueous glyoxal in an organic solvent such as dimethyl formamide. Thus, only isomer (I) reacts with the glyoxal to give the corresponding glyoxylidene (II). The latter is oxidatively cyclized with acid-condensing agents such as $AlCl_3$-NaCl in the presence of an oxidizing agent.

Thus, the novel acedibenzimidazoisoquinolone vat dyes of the present invention are represented by the following structure:

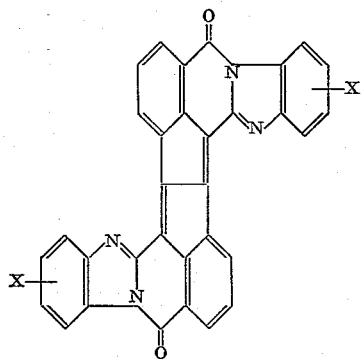

wherein X is H, Cl or Br.

EXAMPLE 1

*Preparation of Products (I), (I-A), and (II)*

The benzimidazoisoquinolone mixture of (I) and (I-A) is obtained by refluxing a mixture of 180 parts of homophthalic acid and 108 parts of o-phenylenediamine in 720 parts of trichlorobenzene for 1 hour. When the mixture is cool, 160 parts of ethanol are added and the suspension is filtered. The resulting filter cake is then washed with ethanol until the filtrate is clear, and then dried. The benzimidazoisoquinolone mixture thus obtained is a bright yellow powder whose properties agree with those reported by Bistrzycki and Fassler, Helv. Chim. Acta, vol. 6, page 526 (1923).

20 parts of an aqueous glyoxal solution containing 6 parts of glyoxal are added to a stirred suspension of 48 parts of the above prepared benzimidazoisoquinolone mixture in 300 parts of dimethyl formamide. The mixture is then heated slowly to 100° C. The suspension of dark red needles is allowed to cool to 55° C. and is filtered. The filter cake is washed with ethanol and dried to give 25.6 parts of pure material. The product (II) is insoluble in all common organic solvents but dissolves readily in concentrated sulfuric acid to give a deep red solution.

EXAMPLE 2

*Preparation of the dichloro derivative of Product II*

This compound is prepared by the method of Example 1 from 268 parts of the chlorobenzimidazoisoquinolone mixture (prepared from 4-chloro-o-phenylene-diamine and homophthalic acid) and 108 parts of an aqueous glyoxal solution, containing 32.4 parts of glyoxal, in 2000 parts of dimethylformamide. The product obtained is a reddish brown solid that gives a bright red color in sulfuric acid.

By replacing the 4-chloro-o-phenylenediamine in this example with 4-bromo-o-phenylenediamine and reacting the bromobenzimidazoisoquinolone mixture with glyoxal in the same manner one obtains the corresponding dibromobenzimidazoisoquinolone condensation product.

EXAMPLE 3

*Preparation of Product III*

A mixture of 5 parts of Product II and 2 parts of manganese dioxide is added slowly to a melt of 40 parts of aluminum chloride, 10 parts of sodium chloride and 2 parts of manganese dioxide at 120–135° C. When the addition is complete, the melt is held at 125–135° C. for 1 hour, and then the mixture is drowned on ice. Filtering the suspension and washing the dye with dilute acid, gives the material as a dark bluish-red cake. The dye dissolves in sulfuric acid with a violet color and gives a green vat which dyes cotton in burgundy shades.

The same dye is obtained if one uses 5 parts of sodium n-nitrobenzene sulfonate in place of each 2-part portion of manganese dioxide in the above procedure.

EXAMPLE 4

*Preparation of a dichloro derivative of Product III*

A mixture of 5 parts of the dichloro intermediate of Example 2 and 5 parts of sodium n-nitrobenzenesulfonate is added slowly to a melt of 60 parts of aluminum chloride, 15 parts of sodium chloride and 5 parts of sodium m-nitrobenzenesulfonate at 130–145° C. When the addition is complete, the melt is held at 130–145° C. for ½ hour longer and then drowned on a mixture of ice and dilute hydrochloric acid. Filtering and washing gives the product as a dark bluish-red solid. This dye also dissolves in sulfuric acid with a violet color, vats green and dyes cotton in reddish-violet shade.

The bromo derivative of Example 2 when ring-closed by the process of this example gives a vat dye having similar properties.

I claim:

1. The compound

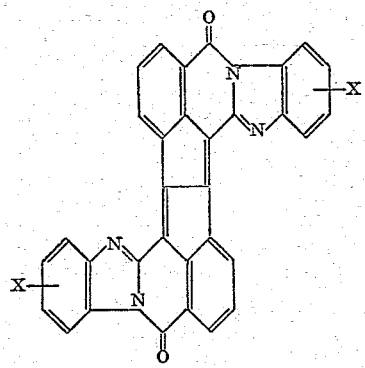

wherein X is taken from the group consisting of hydrogen, chlorine, and bromine.

2. The compound

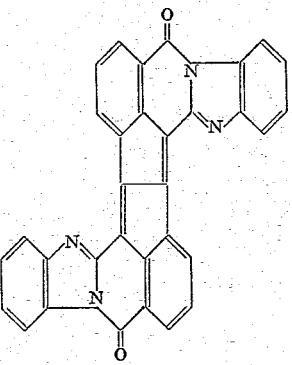

3. The compound

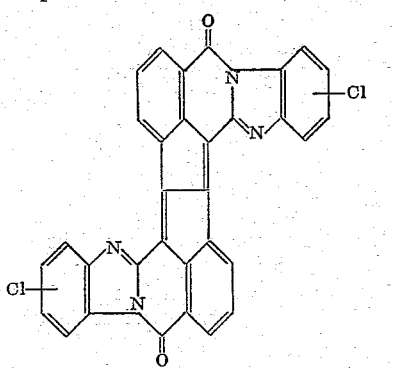

4. The compound

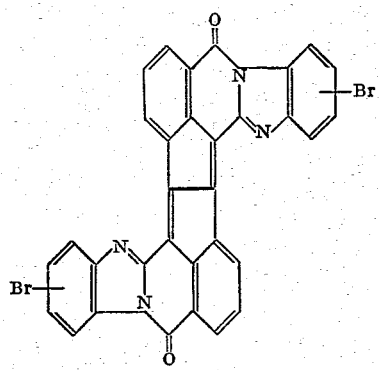

No references cited.